US010357879B2

(12) United States Patent
Hatanaka

(10) Patent No.: US 10,357,879 B2
(45) Date of Patent: Jul. 23, 2019

(54) ROBOT ZERO-POINT CALIBRATION DEVICE AND METHOD

(71) Applicant: FANUC CORPORATION, Yamanashi (JP)

(72) Inventor: Kokoro Hatanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 149 days.

(21) Appl. No.: 15/651,559

(22) Filed: Jul. 17, 2017

(65) Prior Publication Data

US 2018/0021955 A1   Jan. 25, 2018

(30) Foreign Application Priority Data

Jul. 20, 2016   (JP) .................................. 2016-142514

(51) Int. Cl.
*B25J 9/00*   (2006.01)
*B25J 9/16*   (2006.01)

(52) U.S. Cl.
CPC ... *B25J 9/1692* (2013.01); *G05B 2219/39045* (2013.01); *G05B 2219/39047* (2013.01)

(58) Field of Classification Search
USPC ................................................. 700/245–264
See application file for complete search history.

(56) References Cited

U.S. PATENT DOCUMENTS

| 4,132,318 A * | 1/1979 | Wang ..................... B25J 13/082 294/86.4 |
| 8,036,452 B2 * | 10/2011 | Pettersson ............ G01B 11/005 382/154 |
| 9,020,240 B2 * | 4/2015 | Pettersson ............ G01B 11/005 382/154 |
| 2002/0038855 A1 * | 4/2002 | Hwang .................. B25J 9/1692 250/559.29 |

(Continued)

FOREIGN PATENT DOCUMENTS

| CN | 1727839 A | 2/2006 |
| CN | 102679925 A | 9/2012 |

(Continued)

OTHER PUBLICATIONS

Japanese Search Report from Registered Searching Authority dated Aug. 7, 2018, for Japanese Patent Application No. 2016-142514.

(Continued)

*Primary Examiner* — Jonathan L Sample
(74) *Attorney, Agent, or Firm* — Karceski IP Law, PLLC

(57) ABSTRACT

A robot zero-point calibration device includes an axial position recording unit configured to record positional data of each axis of a robot in each of a plurality of postures when a first positioning point and a second positioning point are made to coincide with each other, the first positioning point being disposed at a predetermined coordinate on a base coordinate system of the robot, and the second positioning point being disposed at a predetermined coordinate on a flange coordinate system of the robot. The device also (Continued)

includes a positional offset calculating unit configured to calculate an offset amount of a zero point of each axis of the robot from a true zero point of the axis based on a plurality of sets of the positional data stored in the axial position recording unit.

8 Claims, 8 Drawing Sheets

(56) References Cited

U.S. PATENT DOCUMENTS

| | | | | |
|---|---|---|---|---|
| 2003/0200042 | A1* | 10/2003 | Gan | B25J 9/1692 |
| | | | | 702/105 |
| 2005/0195387 | A1* | 9/2005 | Zhang | G01B 11/002 |
| | | | | 356/138 |
| 2006/0023938 | A1* | 2/2006 | Ban | B25J 9/1692 |
| | | | | 382/153 |
| 2007/0106306 | A1* | 5/2007 | Bodduluri | A61B 17/32053 |
| | | | | 606/133 |
| 2008/0004750 | A1* | 1/2008 | Ban | B25J 9/1692 |
| | | | | 700/245 |
| 2008/0188983 | A1* | 8/2008 | Ban | B25J 9/1692 |
| | | | | 700/245 |
| 2008/0188986 | A1* | 8/2008 | Hoppe | B25J 9/1692 |
| | | | | 700/263 |
| 2008/0234863 | A1* | 9/2008 | Pagel | B25J 9/1692 |
| | | | | 700/254 |
| 2008/0236241 | A1* | 10/2008 | Ino | G01C 25/005 |
| | | | | 73/1.37 |
| 2009/0055118 | A1* | 2/2009 | McLean | G01B 21/045 |
| | | | | 702/95 |
| 2009/0228169 | A1* | 9/2009 | Chiorean | E02F 3/435 |
| | | | | 701/29.1 |
| 2013/0238126 | A1* | 9/2013 | Ohta | B25J 9/1643 |
| | | | | 700/254 |
| 2015/0088311 | A1* | 3/2015 | Suzuki | B25J 9/1697 |
| | | | | 700/254 |
| 2016/0184996 | A1* | 6/2016 | Ishige | B25J 9/1692 |
| | | | | 700/254 |
| 2017/0217020 | A1 | 8/2017 | Suzuki et al. | |
| 2017/0270631 | A1* | 9/2017 | Melikian | G06T 1/0014 |
| 2018/0169854 | A1* | 6/2018 | Shiratsuchi | B25J 9/10 |

FOREIGN PATENT DOCUMENTS

| | | |
|---|---|---|
| CN | 103302663 A | 9/2013 |
| EP | 1621297 A1 | 2/2006 |
| EP | 2636491 A2 | 9/2013 |
| EP | 2853356 A1 | 4/2015 |
| JP | S63318275 A | 12/1988 |
| JP | H06-134683 | 5/1994 |
| JP | 2001018182 A | 1/2001 |
| JP | 2002018750 A | 1/2002 |
| JP | 2002103259 A | 4/2002 |
| JP | 2006035384 A | 2/2006 |
| JP | 2013184235 A | 9/2013 |
| JP | 2015066603 A | 4/2015 |

OTHER PUBLICATIONS

Japanese Office Action dated Aug. 7, 2018, for Japanese Patent Application No. 2016-142514.
Chinese Office Action dated Apr. 28, 2019, for Chinese Patent Application No. 201710577214.9.

* cited by examiner

ROBOT ZERO-POINT CALIBRATION DEVICE AND METHOD

CROSS-REFERENCE TO RELATED APPLICATIONS

This application claims the benefit of and priority to Japanese Patent Application No. 2016-142514, filed on Jul. 20, 2016, the entire content of which is incorporated herein by reference.

FIELD OF THE INVENTION

The present invention relates to a robot zero-point calibration device and a robot zero-point calibration method.

BACKGROUND OF THE INVENTION

In a conventionally known robot zero-point calibration device (as described, for example, by Japanese Unexamined Patent Application, Publication No. Hei 6-134683, for example) configured to calibrate a zero point of a robot, the robot is manually put into such a position by a worker that a predetermined positional relation is achieved between a calibration jig attached to a wrist flange of the robot and a calibration jig attached to a base of the robot. The worker performs this positioning while checking a plurality of dial gauges indicating an interval between calibration jigs. Then, the position of the robot is reflected on a predetermined position of each axis of the robot.

SUMMARY OF THE INVENTION

A robot zero-point calibration device according to an aspect of the present invention includes: an axial position recording unit configured to record positional data of each axis of a robot in each of a plurality of postures when a first positioning point and a second positioning point are made to coincide with each other, the first positioning point being disposed at a predetermined coordinate on a base coordinate system of the robot, and the second positioning point being disposed at a predetermined coordinate on a flange coordinate system of the robot; and a positional offset calculating unit configured to calculate an offset amount of a zero point of each axis of the robot from a true zero point of the axis based on a plurality of sets of the positional data stored in the axial position recording unit.

A robot zero-point calibration method according to another aspect of the present invention includes: a positioning step of making a first positioning point and a second positioning point coincide with each other in each of a plurality of postures, the first positioning point being disposed at a predetermined coordinate on a base coordinate system of a robot, and the second positioning point being disposed at a predetermined coordinate on a flange coordinate system of the robot; an axial position recording step of recording positional data of each axis of the robot when the first positioning point and the second positioning point are made coincide with each other while the robot is in each posture at the positioning step; and a positional offset calculating step of calculating an offset amount of a zero point of each axis of the robot from a true zero point of the axis based on a plurality of sets of the positional data stored at the axial position recording step.

DESCRIPTION OF EMBODIMENTS

The following describes a zero-point calibration device 1 for a robot 2 according to an embodiment of the present invention and a zero-point calibration method therefore with reference to the accompanying drawings.

Figure 1:
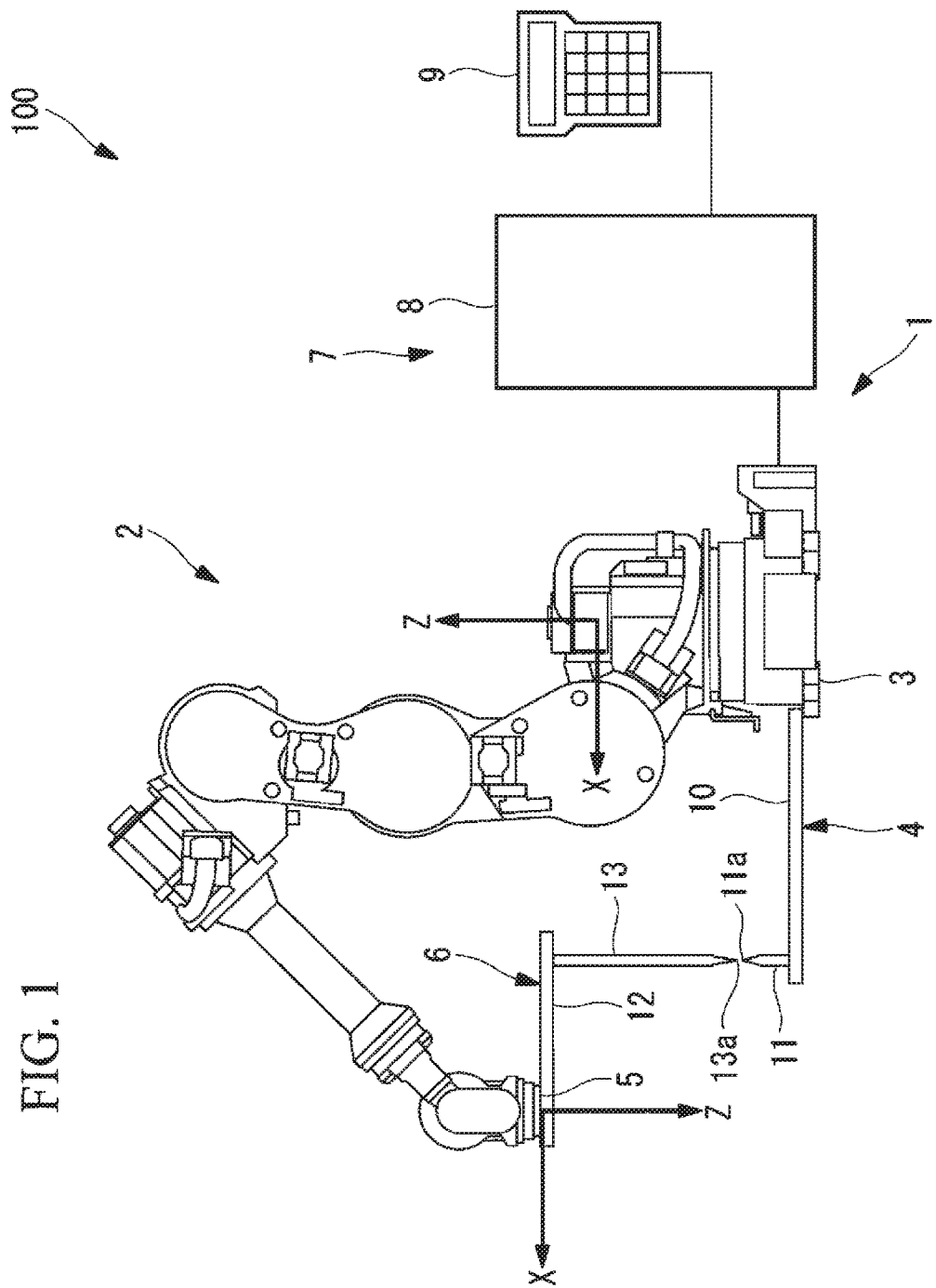
FIG. 1 is an entire configuration diagram illustrating a robot system provided with a robot zero-point calibration device according to an embodiment of the present invention.

The zero-point calibration device 1 for the robot 2 according to the present embodiment is provided to a robot system 100 illustrated in FIG. 1 and configured to calibrate a zero point of a seven-axis robot. The zero-point calibration device 1 includes a first calibration jig 4 fixed to a base 3 of the robot 2, a second calibration jig 6 fixed to a wrist flange 5, and a calculating unit 8 provided to a control device 7 connected with the robot 2. In FIG. 1, reference sign 9 denotes a teach pendant used by an operator manually operating the robot 2.

In the example illustrated in FIG. 1, the first calibration jig 4 includes a band-plate bracket 10 having one end fixed to the base 3 of the robot 2, and a round-bar shaft 11 extending vertically upward near the other end of the bracket 10 and including an acute first tip 11a at an upper end. The second calibration jig 6 includes a band-plate bracket 12 having one end fixed to the wrist flange 5 of the robot 2, and a round-bar shaft 13 oppositely extending with respect to the wrist flange 5 in a thickness direction of the bracket 12 from the other end of the bracket 12 and including an acute second tip 13a at a leading end.

The brackets 10 and 12 and the shafts 11 and 13 of the first calibration jig 4 and the second calibration jig 6 have such dimensions as to allow the first tip 11a and the second tip 13a to coincide with each other as illustrated in FIG. 1. The first tip 11a of the shaft 11 of the first calibration jig 4 provides a first positioning point at a predetermined coordinate on the base coordinate system when the bracket 10 is fixed to the base 3 of the robot 2. The second tip 13a of the shaft 13 of the second calibration jig 6 provides a second positioning point at a predetermined coordinate on the flange coordinate system when the bracket 12 is fixed to the wrist flange 5 of the robot 2.

The first calibration jig 4 and the second calibration jig 6 may have optional shapes including the first tip 11a and the second tip 13a that can be positioned to coincide with each other.

Figure 2:
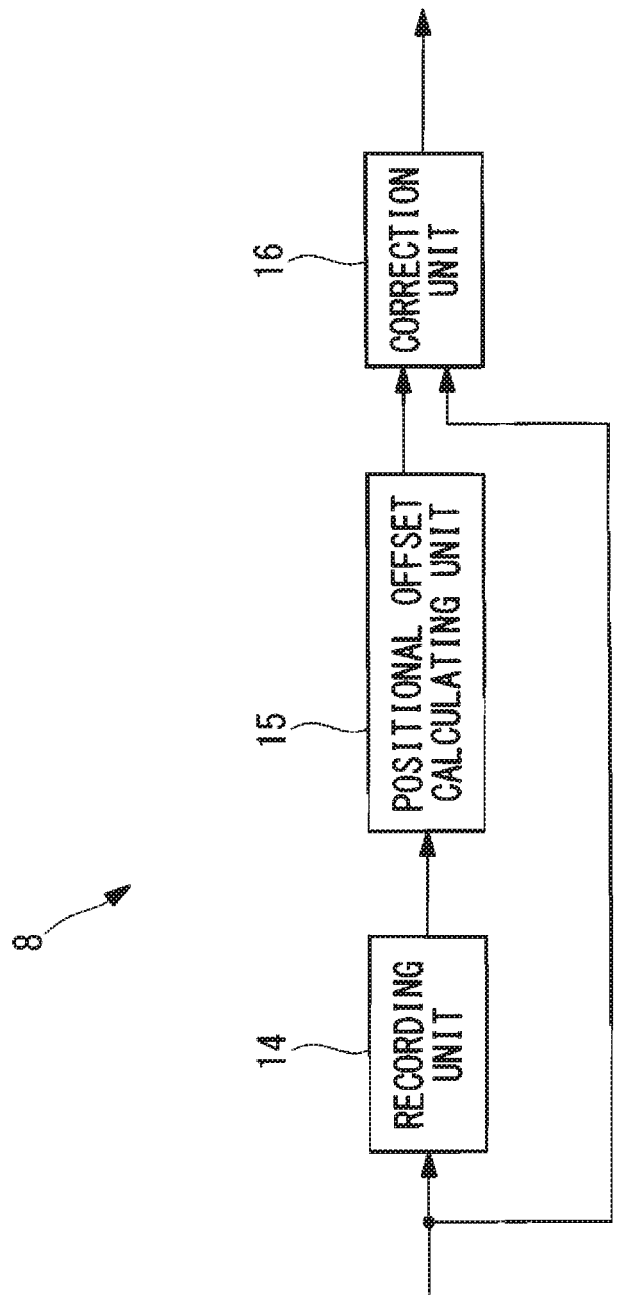
FIG. 2 is a block diagram illustrating a calculating unit of the zero-point calibration device in FIG. 1.

As illustrated in FIG. 2, the calculating unit 8 includes a recording unit (axial position recording unit) 14, a positional offset calculating unit 15, and a correction unit 16. The recording unit 14 is configured to store positional data of the position of each axis of the robot 2 detected by an encoder (not illustrated) provided to a motor of the axis. The positional offset calculating unit 15 is configured to calculate an offset amount of a zero point of the axis of the robot 2 from the true zero point thereof based on the positional data recorded in the recording unit 14. The correction unit 16 is configured to correct the positional data of the axis of the robot 2 based on the offset amount calculated by the positional offset calculating unit 15.

The recording unit 14 records the first set of positional data of all axes detected so far by the encoder when the operator manually operates the teach pendant 9 to actuate the robot 2 and put the robot 2 into a first posture in which the first tip 11a of the first calibration jig 4 and the second tip 13a of the second calibration jig 6 coincide with each other as illustrated in, for example, FIG. 1, and inputs a record command through the teach pendant 9.

Then, the operator manually operates the teach pendant 9 to change the posture of the robot 2 into a second posture different from the first posture, in which the first tip 11a and the second tip 13a are made coincide with each other. In this state, when the operator inputs a record command through the teach pendant 9, the recording unit 14 records the second set of positional data of all axes detected so far by the encoder.

Similarly, the operator inputs a record command through the teach pendant 9 while the first tip 11a and the second tip 13a are made coincide with each other whereas the robot 2 is in a third posture different from the first posture and the second posture. Accordingly, the recording unit 14 records the third set of positional data of all axes detected so far by the encoder.

When the three sets of positional data are recorded for the three different postures, the recording unit 14 transfers the recorded three sets of positional data to the positional offset calculating unit 15. The positional offset calculating unit 15 calculates the offset amount as described below.

The coordinates of the first positioning point on the base coordinate system are represented by (Xt, Yt, Zt), and the coordinates of the second positioning point on the flange coordinate system are represented by (Xp, Yp, Zp).

The offset amount of a temporarily set zero point of each axis of the robot 2 from the true zero point thereof are represented by ΔΘ=(ΔΘ1, ΔΘ2, ΔΘ3, ΔΘ4, ΔΘ5, ΔΘ6, ΔΘ7).

The coordinates (X2, Y2, Z2) of the second positioning point on the base coordinate system while the robot 2 is disposed in the first posture illustrated in FIG. 1 is calculated by performing forward transform of the detected positional data of each axis of the robot 2 and adding, to the transformed positional data, transformed coordinates of the coordinates (Xp, Yp, Zp) of the second positioning point provided by the second calibration jig 6.

As a result, (X2, Y2, Z2) and (Xt, Yt, Zt) are ideally expected to be equal to each other, but are not in reality. A difference between those coordinates when positioning is performed m times for different robot postures is given by Expression (1).

$$ei = \begin{bmatrix} X2i - Xt \\ Y2i - Yt \\ Z2i - Zt \end{bmatrix} \quad (1)$$

(i=1 to m; X2i, Y2i, and Z2i represent X2, Y2, and Z2, respectively, for the i-th positioning)

The difference ei is a function of the above-described offset amount ΔΘ, and thus a relation expressed by Expression (2) holds therebetween.

$$\begin{bmatrix} e1 \\ \vdots \\ em \end{bmatrix} = g(\Delta\theta) \quad (2)$$

$$\Delta\theta = \begin{pmatrix} \begin{bmatrix} \Delta\theta1 \\ \Delta\theta2 \\ \Delta\theta3 \\ \Delta\theta4 \\ \Delta\theta5 \\ \Delta\theta6 \\ \Delta\theta7 \end{bmatrix} \end{pmatrix}$$

In Expression (2), the offset amount ΔΘ has seven unknown values whereas the difference ei has three values for each posture. Thus, the offset amount ΔΘ can be obtained from the positional data acquired in three postures. The offset amount ΔΘ is obtained by the well-known method such as Newton's method or a neural network technique for calculating the offset amount ΔΘ with which the difference ei is smallest.

The correction unit 16 calculates new positional data for the positional data of each axis of the robot 2 in, for example, the recorded third set of positional data by subtracting the offset amount ΔΘ from this positional data of the axis. The control device 7 of the robot 2 replaces the positional data of each axis of the robot 2 with the new positional data calculated by the correction unit 16, thereby calibrating the zero point of the axis.

The following describes a zero-point calibration method using the zero-point calibration device 1 for the robot 2 according to the present embodiment, which is configured as above.

Figure 3:
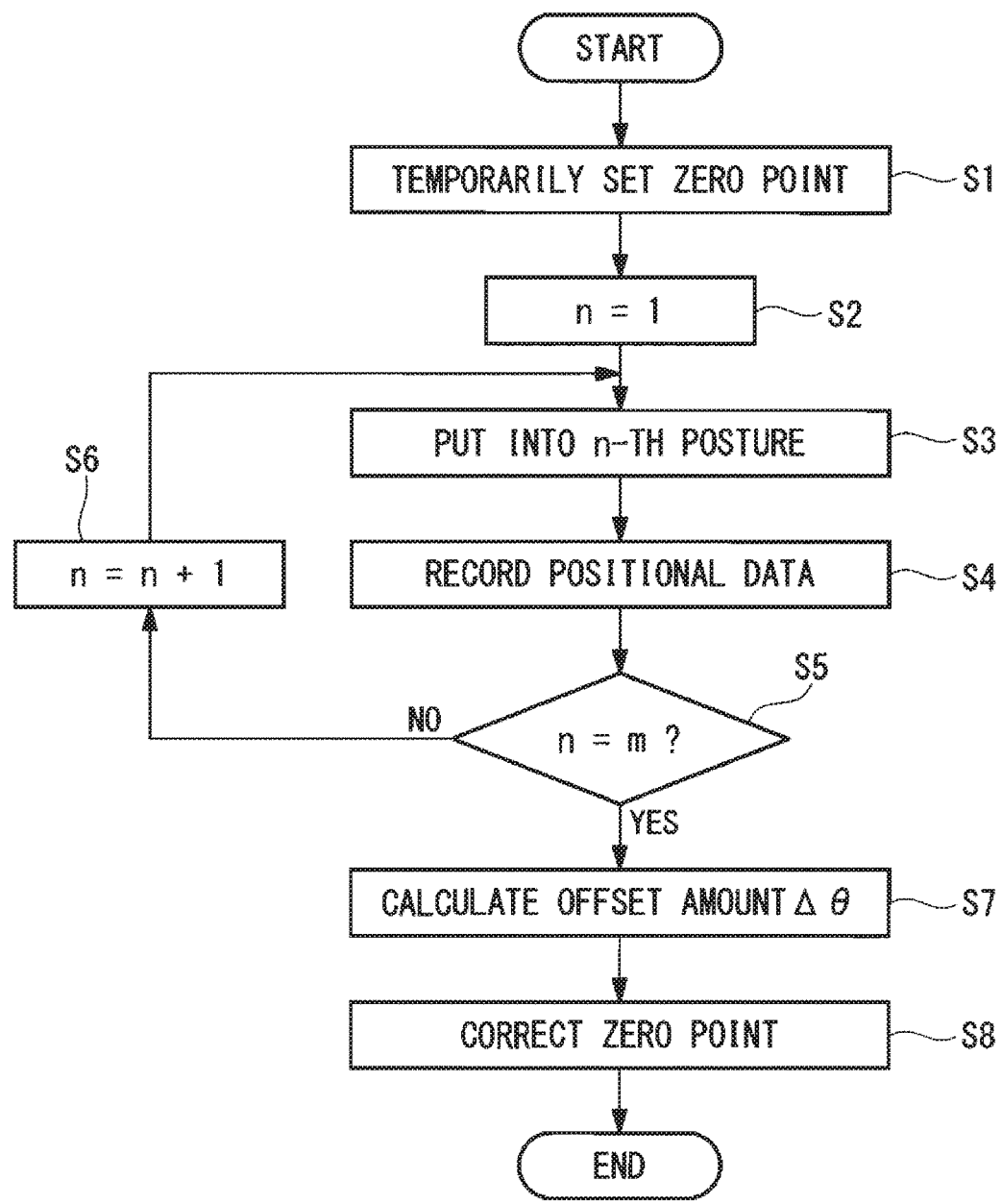
FIG. 3 is a flowchart for description of a zero-point calibration method according to another embodiment of the present invention using the zero-point calibration device in FIG. 1.

In the zero-point calibration method for the robot 2 according to the present embodiment, as illustrated in FIG. 3, a temporal zero point is roughly set (step S1), and a count n is initialized (step S2).

Subsequently, the teach pendant 9 is manually operated to put the robot 2 into the n-th posture in which the first tip 11a of the first calibration jig 4 fixed to the base 3 and the second tip 13a of the second calibration jig 6 fixed to the wrist flange 5 are made coincide with each other (positioning step S3).

The positional data detected by the encoder of each axis of the robot 2 in the n-th posture is recorded in the recording unit 14 (axial position recording step S4).

It is then determined whether the count n is equal to m (in the above description, m=3) set in advance (step S5). If the count n is not equal to m, the count n is incremented (step S6), and the process at step S3 or later is repeated.

If the count n is equal to m at step S5, the offset amount ΔΘ of the current zero point, which is temporarily set, from the true zero point is calculated by the positional offset calculating unit 15 (positional offset calculating step S7), and the current zero point is corrected by the correction unit 16 (step S8).

In this manner, the zero-point calibration device 1 and the zero-point calibration method for the robot 2 according to the present embodiment eliminate the need to manually put the robot 2 into a posture in which readings of dial gauges for six axes are simultaneously in predetermined ranges as conventionally done, which advantageously leads to a simpler operation. Moreover, when the robot has seven axes, zero-point calibration operations of two kinds need to be performed separately for one axis and six axes in conventional cases. However, the zero-point calibration device 1 and the zero-point calibration method according to the present embodiment only require a zero-point calibration operation of one kind to be performed three times, which leads to a further simpler operation.

Figure 4:
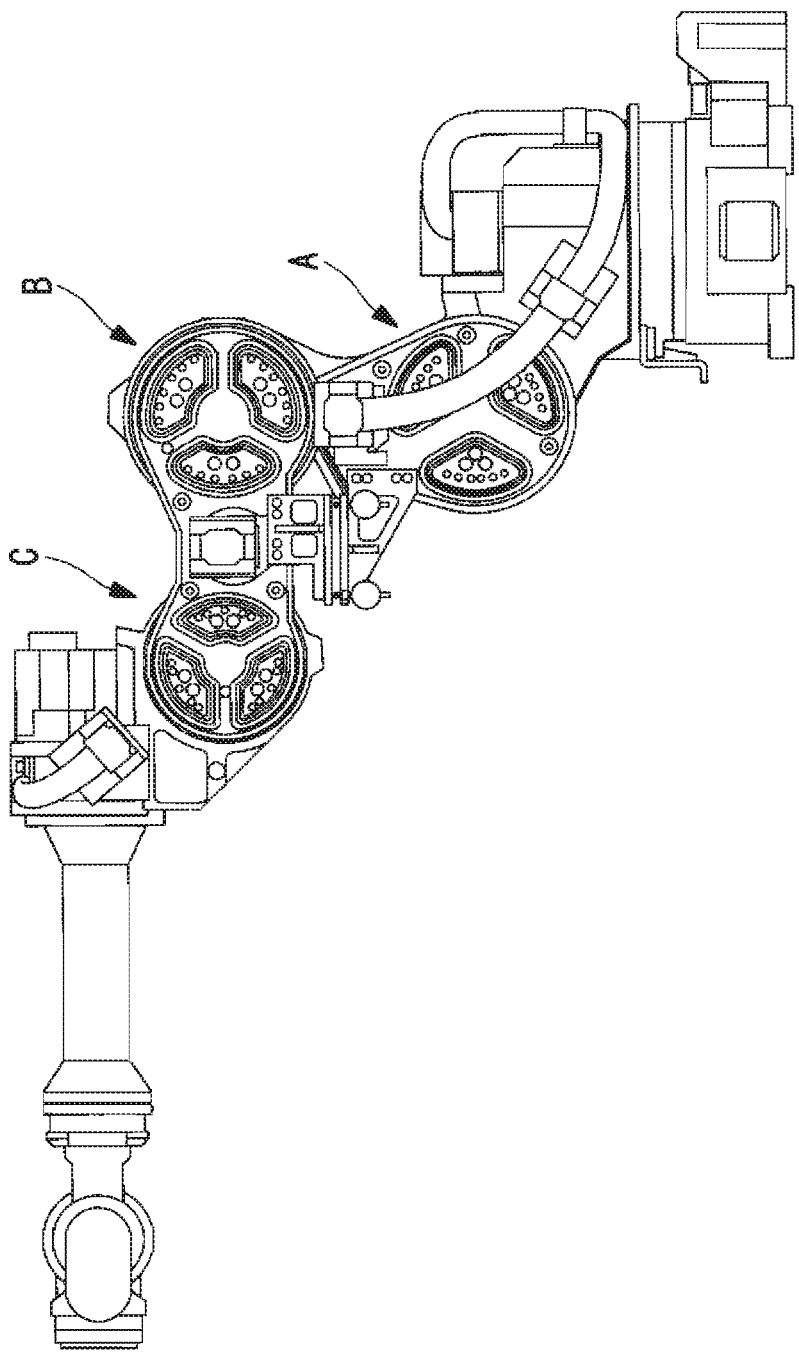
FIG. 4 is a diagram for description of zero-point calibration operation for one axis by a conventional zero-point calibration method.
Figure 5:
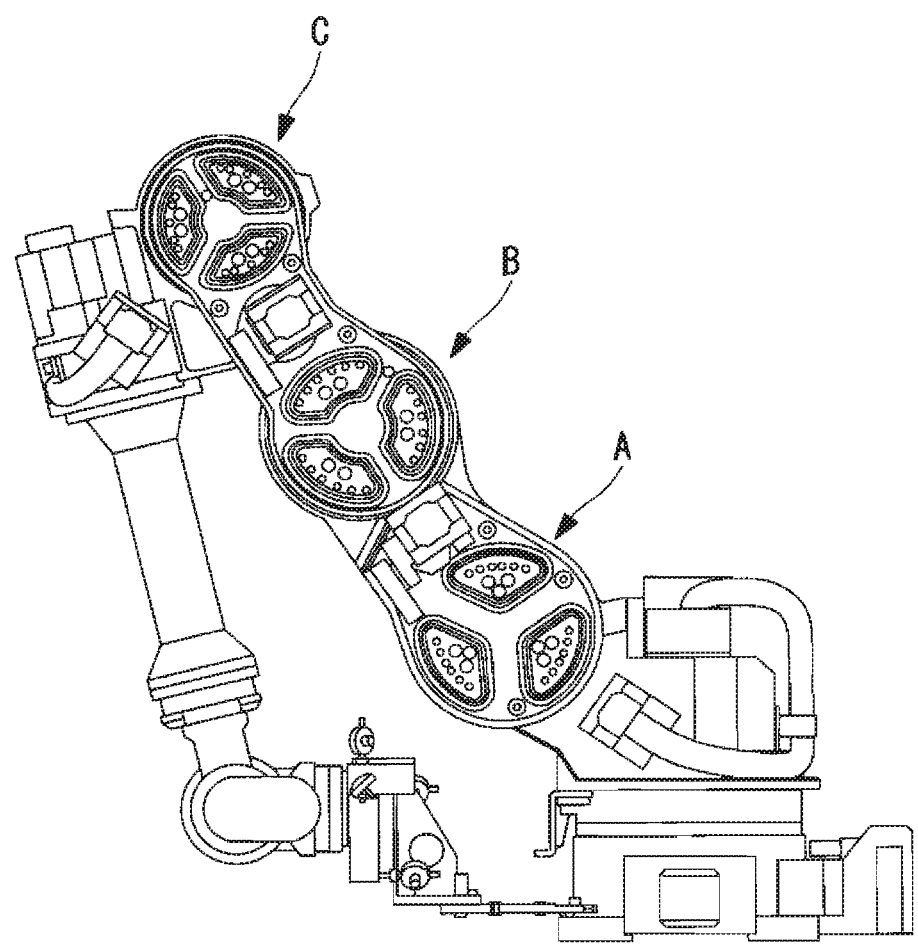
FIG. 5 is a diagram for description of zero-point calibration operation for six axes by a conventional zero-point calibration method.

In the conventional seven-axis robot zero-point calibration method, the zero-point calibration is performed separately for a first axis about an axial line vertical to the base 3 and the other six axes. However, in a case of a seven-axis robot with an axial configuration including a second axis A, a third axis B, and a fourth axis C having horizontal axial lines parallel to one another as illustrated in, for example, FIGS. 4 and 5, the zero-point calibration operation for the third axis B and the zero-point calibration operation for the other six axes A and C involve coupling and decoupling of different calibration jigs. According to the present embodiment, however, a calibration jig of one kind is used for a zero-point calibration operation of one kind, thereby achieving reduction in the number of kinds of calibration jigs. In addition, each calibration jig can have an extremely simple structure, which advantageously leads to cost reduction.

In the present embodiment, the first calibration jig 4 including the first tip 11a at the first positioning point is exemplarily described as a first calibration jig providing a first positioning point fixed on the base coordinate system, and the second calibration jig 6 including the second tip 13a at the second positioning point is exemplarily described as a second calibration jig providing a second positioning point fixed on the flange coordinate system. However, in place of these calibration jigs, a first calibration jig 17 and a second calibration jig 18 described below may be employed.

Figure 6:
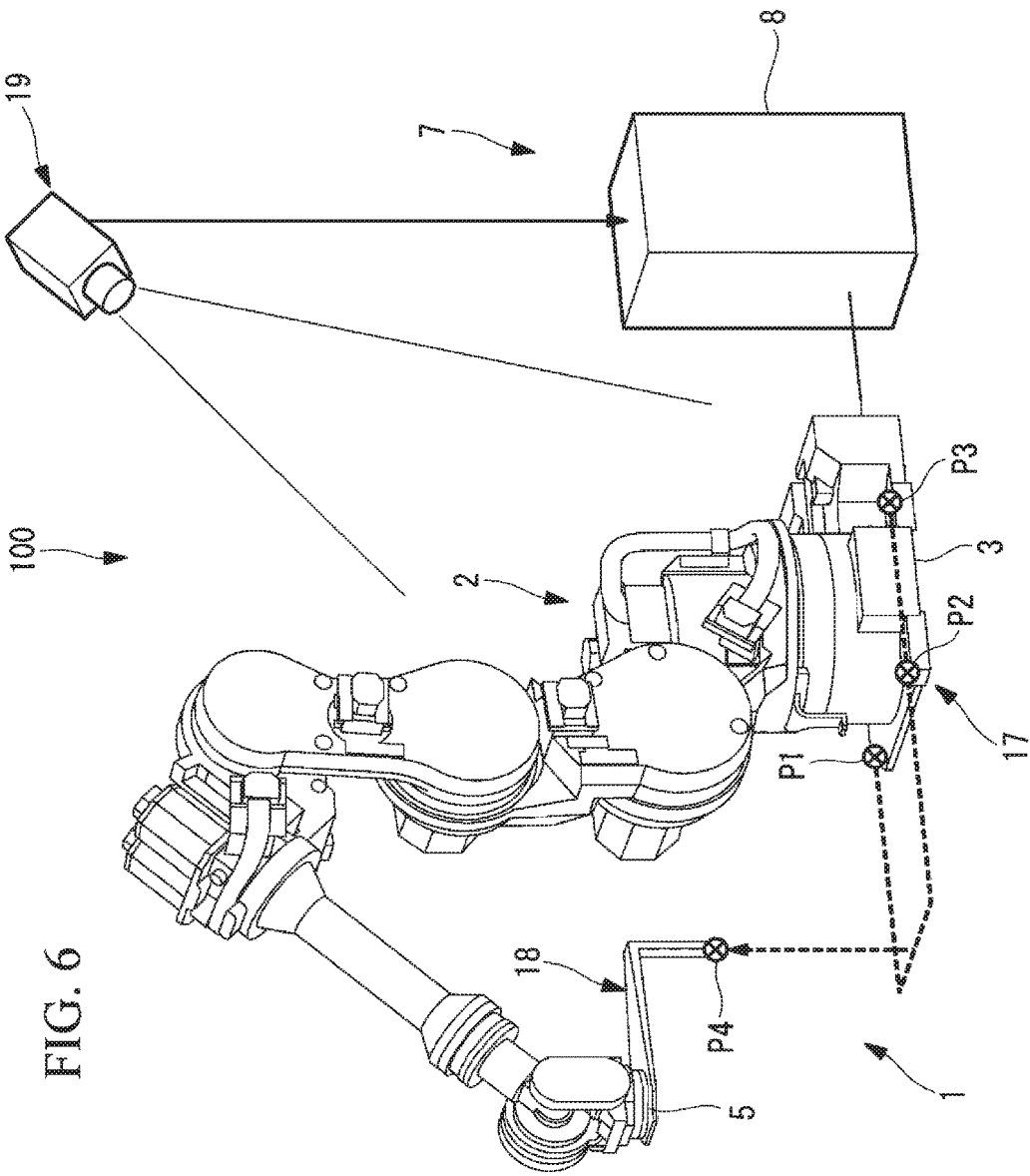
FIG. 6 is a perspective view illustrating a first modification of the zero-point calibration device in FIG. 1.

In a first modification, as illustrated in FIG. 6, a three-dimensional measurement device 19 is disposed outside of the robot 2, the first calibration jig 17 is provided with three measurement targets P1, P2, and P3 measured by the three-dimensional measurement device 19, and the second calibration jig 18 is provided with one measurement target P4 measured by the three-dimensional measurement device 19.

With this configuration, a first positioning point fixed on the base coordinate system can be provided in space through measurement of the three measurement targets P1, P2, and P3 provided to the first calibration jig 17 by the three-dimensional measurement device 19. The one measurement target P4 provided to the second calibration jig 18 provides a second positioning point.

Accordingly, the robot 2 only needs to be actuated so that the measurement target P4 provided to the second calibration jig 18 coincides with the first positioning point in space provided by the first calibration jig 17, while the measurement target P4 is detected by the three-dimensional measurement device 19. The robot 2 may be manually moved by the operator operating the teach pendant 9 as described above, or may be automatically moved by the control device 7 of the robot 2 based on information measured by the three-dimensional measurement device 19.

Automatically putting the robot 2 into a posture for zero-point calibration through the control device 7 of the robot 2 can advantageously reduce variation in calibration accuracy between individual workers and reduce loads on the workers.

Figure 7:
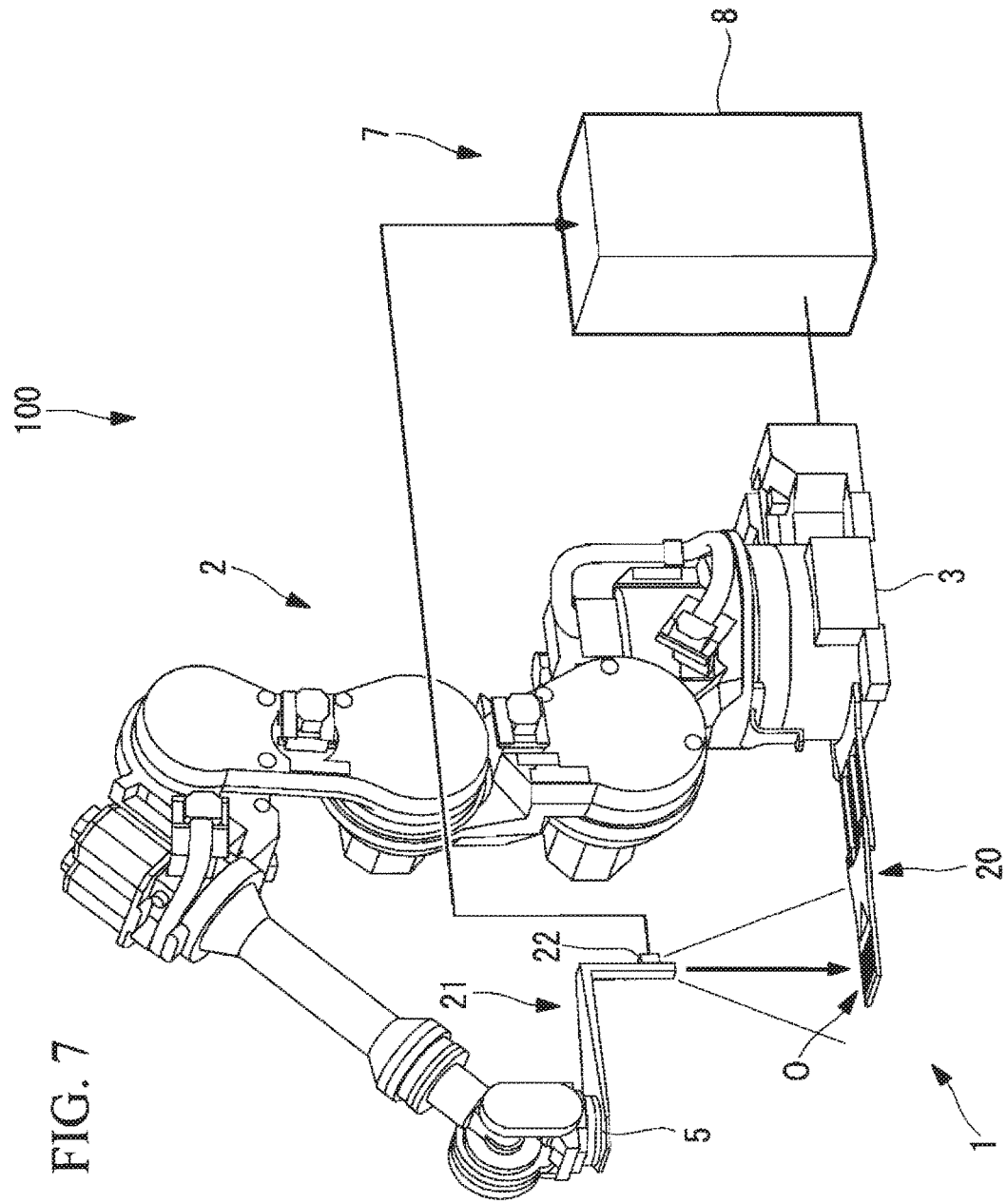
FIG. 7 is a perspective view illustrating a second modification of the zero-point calibration device in FIG. 1.

In a second modification, as illustrated in FIG. 7, a second calibration jig 21 includes a camera 22, and a first calibration jig 20 is provided with a geometric characteristic o measurable by the camera 22.

With this configuration, the geometric characteristic o present in an image of the first calibration jig 20 acquired by the camera 22 is recognized to detect a relative positional relation between the camera 22 and the first calibration jig 20, in other words, a relative positional relation between the first calibration jig 20 and the second calibration jig 21.

Then, the control device 7 of the robot 2 actuates the robot 2 based on this information acquired by the camera 22 so that the first calibration jig 20 and the second calibration jig 21 are disposed in a predetermined relative positional relation. Accordingly, the robot 2 can be automatically put into a posture for zero-point calibration.

Figure 8:
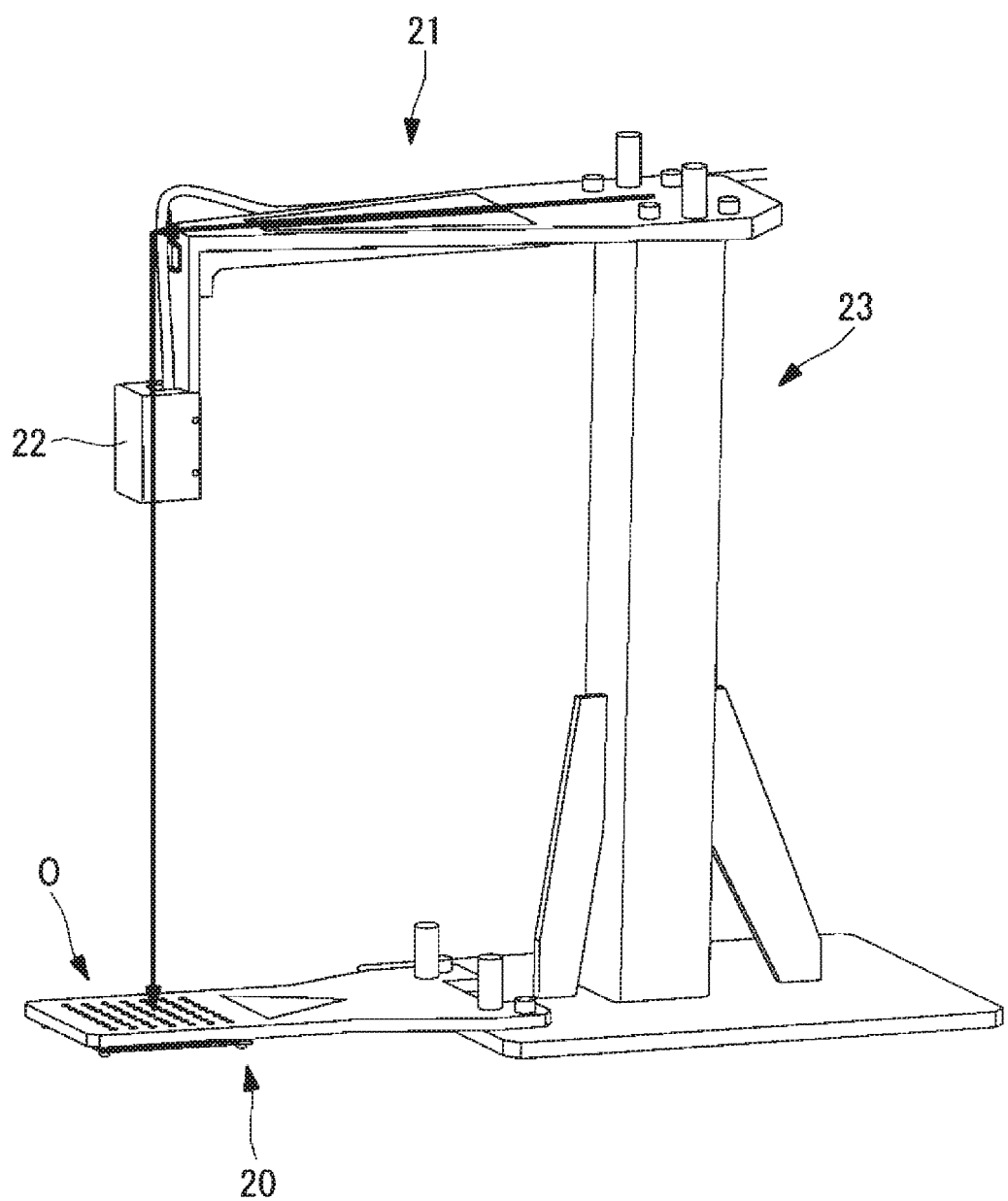
FIG. 8 is a perspective view illustrating an exemplary calibration jig for calibrating a camera in the zero-point calibration device in FIG. 7.

In the zero-point calibration using the camera 22, a camera calibration jig 23 capable of simulating the actual positional relation between the first calibration jig 20 and the second calibration jig 21 as illustrated in, for example, FIG. 8 may be used to calibrate and store the geometric characteristic o of the first calibration jig 20 through the image recognition using the camera 22 in advance.

In the example illustrated in FIG. 8, the camera calibration jig 23 has a column shape including, at a lower part, the geometric characteristic o same as that of the first calibration jig 20. When the second calibration jig 21 is temporarily fixed at an upper end of the camera calibration jig 23, the camera 22 of the second calibration jig 21 is positioned at a predetermined interval to the geometric characteristic o.

Although the present embodiment exemplarily describes a seven-axis robot, the present invention may be applied to a six-axis robot or a robot having eight axes or more instead.

The positional data of each axis needs to be recorded in at least two postures for a six-axis robot or in at least three postures for a seven-axis robot. The recording of the positional data of each axis in a larger number of postures can achieve reduction in inaccuracy, in other words, error reduction of zero-point calibration.

In the above-described embodiment, the offset amount ΔΘ has unknown elements for seven axes of a seven-axis robot. However, the function of Expression (2) may be solved with Expression (3) below, which represents the offset amount ΔΘ with taken into account influence of gravity exerted on the robot 2 in the X and Z directions in FIG. 1.

$$\Delta\theta = \begin{bmatrix} \Delta\theta1 \\ \Delta\theta2 \\ \Delta\theta3 \\ \Delta\theta4 \\ \Delta\theta5 \\ \Delta\theta6 \\ \Delta\theta7 \\ Xt \\ Zt \\ Xp \\ Zp \end{bmatrix} \quad (3)$$

Expression (3) can provide the offset amount ΔΘ in accordance with the realistic parameters Xt, Zt, Xp, and Zp. Since the function has 11 unknowns in this case, the robot 2 needs to be positioned in four postures or more.

From the above-described embodiment, the following invention is derived.

A robot zero-point calibration device according to an aspect of the present invention includes: an axial position recording unit configured to record positional data of each axis of a robot in each of a plurality of postures when a first positioning point and a second positioning point are made coincide with each other, the first positioning point being disposed at a predetermined coordinate on a base coordinate system of the robot, and the second positioning point being disposed at a predetermined coordinate on a flange coordinate system of the robot; and a positional offset calculating unit configured to calculate an offset amount of a zero point of each axis of the robot from a true zero point of the axis based on a plurality of sets of the positional data stored in the axial position recording unit.

According to the present aspect, the axial position recording unit acquires a plurality of sets of the positional data of each axis of the robot by recording the positional data of the axis of the robot in each of a plurality of postures when the first positioning point at a predetermined coordinate on the base coordinate system of the robot and the second positioning point at a predetermined coordinate on the flange coordinate system of the robot are made coincide with each other. The acquired positional data is in three dimensions per one posture. Thus, positional data necessary for calculating the offset amount of the zero point of each axis of the robot from the true zero point thereof can be obtained by performing the acquisition in two postures or more for a six-axis robot, or in three postures or more for a seven-axis robot.

Then, the positional offset calculating unit calculates, based on the positional data obtained in this manner, the offset amount of the zero point of each axis of the robot from the true zero point thereof. Thus, the zero point of the axis of the robot can be calibrated by correcting the zero point by the calculated offset amount.

Accordingly, the present aspect eliminates the need to perform a manual robot operation to set readings of six dial gauges simultaneously in predetermined ranges, thereby facilitating zero-point calibration in six axes or more.

In the above-described aspect, the robot may be a seven-axis robot, and the axial position recording unit may record the positional data of each axis of the robot when the first positioning point is made coincide with the second positioning point while the robot is in three postures or more.

With this configuration, zero-point calibration can be performed for seven axes by performing, three times for the robot in different postures, a positioning operation of one kind to make the first positioning point coincide with the second positioning point.

In the above-described aspect, the robot zero-point calibration device may further include a first calibration jig fixed to a base of the robot to provide the first positioning point, and a second calibration jig fixed to a wrist flange of the robot to provide the second positioning point.

With this configuration, the first positioning point is provided at a predetermined position on the base coordinate system when the first calibration jig is attached to the base of the robot, and the second positioning point is provided at a predetermined position on the flange coordinate system when the second calibration jig is attached to the wrist flange of the robot. Accordingly, the posture of the robot can be set so that the first positioning point coincides with the second positioning point.

In the above-described aspect, the first calibration jig may include a first tip at the first positioning point, and the second calibration jig may include a second tip at the second positioning point.

With this configuration, the first positioning point and the second positioning point can be easily made coincide with each other by manually actuating the robot to visually make the first tip of the first calibration jig fixed to the base and the second tip of the second calibration jig fixed to the wrist flange coincide with each other.

In the above-described aspect, the first calibration jig may be provided with three measurement targets measurable by a three-dimensional measurement device, and the second calibration jig may be provided with one measurement target measurable by the three-dimensional measurement device.

With this configuration, the three-dimensional measurement device measures the three measurement targets provided to the first calibration jig attached to the base, thereby setting, in space, the first positioning point fixed to the base. Then, positioning can be performed between the first positioning point and the second positioning point by making the one measurement target provided to the second calibration jig attached to the wrist flange coincide with the first positioning point set in space.

This allows manual and automatic execution of an operation to make the measurement target of the second calibration jig coincide with the first positioning point set in space while the three-dimensional measurement device checks the position of the measurement target. This automatic positioning operation can reduce variation in calibration accuracy between individual workers and reduce loads on the workers.

In the above-described aspect, the second calibration jig may include a camera, and the first calibration jig may be provided with a geometric characteristic measurable by the camera.

With this configuration, it is possible to accurately recognize a relative positional relation between the camera and the geometric characteristic, in other words, a relative positional relation between the first positioning point fixed to the base and the second positioning point fixed to the wrist flange by performing image capturing and recognition of the geometric characteristic provided to the first calibration jig attached to the base through the camera attached to the wrist flange, and to make the positioning points coincide with each other.

This allows manual and automatic execution of an operation to make the first positioning point set in space and the second positioning point coincide with each other while the camera recognizes the geometric characteristic of the first calibration jig. This automatic positioning operation can reduce variation in calibration accuracy between individual workers and reduce loads on the workers.

A robot zero-point calibration method according to another aspect of the present invention includes: a positioning step of making a first positioning point and a second positioning point coincide with each other in each of a plurality of postures, the first positioning point being disposed at a predetermined coordinate on a base coordinate system of a robot, and the second positioning point being disposed at a predetermined coordinate on a flange coordinate system of the robot; an axial position recording step of recording positional data of each axis of the robot when the first positioning point and the second positioning point are made coincide with each other while the robot is in each posture at the positioning step; and a positional offset calculating step of calculating an offset amount of a zero point of each axis of the robot from a true zero point of the axis based on a plurality of sets of the positional data stored at the axial position recording step.

In the above-described aspect, the robot may be a seven-axis robot, and the axial position recording step may record the positional data of each axis of the robot when the first positioning point is made coincide with the second positioning point while the robot is in three postures or more.

The invention claimed is:

1. A robot zero-point calibration device, comprising:
an axial position recording unit configured to record positional data of each axis of a robot in each of a plurality of postures when a first positioning point and second positioning point are made to coincide with each other, the first positioning point being disposed at a predetermined coordinate on a base coordinate system of the robot, and the second positioning point being disposed at a predetermined coordinate on a flange coordinate system of the robot; and
a positional offset calculating unit configured to calculate an offset amount of a zero point of each axis of the robot from a true zero point of the axis based on a plurality of sets of the positional data stored in the axial position recording unit, wherein
the positional offset calculating unit is configured to calculate
coordinates of the second positioning point on the base coordinate system from a set of positional data in each of the plurality of postures and the predetermined coordinate of the second positioning point on the flange coordinate system,
differences between the coordinates of the each of the second positioning point on the base coordinate of the predetermined coordinate of the first positioning point, and
an offset amount of each axis based on a plurality of the calculated differences.

2. The robot zero-point calibration device according to claim 1, wherein
the robot is a seven-axis robot, and
the axial position recording unit records the positional data of each axis of the robot when the first positioning point is made to coincide with the second positioning point while the robot is in three postures or more.

3. The robot zero-point calibration device according to claim 1, further comprising:
a first calibration jig fixed to a base of the robot to provide the first positioning point; and
a second calibration jig fixed to a wrist flange of the robot to provide the second positioning point.

4. The robot zero-point calibration device according to claim 3, wherein
the first calibration jig includes a first tip at the first positioning point, and
the second calibration jig includes a second tip at the second positioning point.

5. The robot zero-point calibration device according to claim 3, wherein
the first calibration jig is provided with three measurement targets measurable by a three-dimensional measurement device, and
the second calibration jig is provided with one measurement target measurable by the three-dimensional measurement device.

6. The robot zero-point calibration device according to claim 3, wherein
the second calibration jig includes a camera, and
the first calibration jig is provided with a geometric characteristic measurable by the camera.

7. A robot zero-point calibration method, comprising:
making a first positioning point and a second positioning point coincide with each other in each of a plurality of postures, the first positioning point being disposed at a predetermined coordinate on a base coordinate system of a robot, and the second positioning point being disposed at a predetermined coordinate on a flange coordinate system of the robot;
recording positional data of each axis of the robot when the first positioning point and the second positioning point are made coincide with each other while the robot is in each posture at the positioning step; and
calculating an offset amount of a zero point of each axis of the robot from a true zero point of the axis based on a plurality of sets of the positional data stored at the axial position recording step, wherein
the calculating of the offset amount includes
calculating coordinates of the second positioning point on the base coordinate system from a set of positional data in each of the plurality of postures and the predetermined coordinate of the second positioning point on the flange coordinate system,
calculating differences between the coordinates of the each of the second positioning point on the base coordinate system and the coordinates of the predetermined coordinate of the first positioning point, and
calculating the offset amount of the each axis based on a plurality of the calculated differences.

8. The robot zero-point calibration method according to claim 7, wherein
the robot is a seven-axis robot, and
the axial position recording step records the positional data of each axis of the robot when the first positioning point is made to coincide with the second positioning point while the robot is in three postures or more.

* * * * *